US012802189B2

(12) United States Patent
Kim et al.

(10) Patent No.: US 12,802,189 B2
(45) Date of Patent: Nov. 17, 2026

(54) LEARNING DEVICE, LEARNING METHOD THEREOF, TEST DEVICE USING THE SAME, AND TEST METHOD USING THE SAME

(71) Applicants: Hyundai Motor Company, Seoul (KR); Kia Corporation, Seoul (KR)

(72) Inventors: Jang Yoon Kim, Seoul (KR); Jin Sol Kim, Hwaseong-Si (KR); Jin Ho Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 344 days.

(21) Appl. No.: 18/430,925

(22) Filed: Feb. 2, 2024

(65) Prior Publication Data

US 2025/0078235 A1 Mar. 6, 2025

(30) Foreign Application Priority Data

Aug. 29, 2023 (KR) ........................ 10-2023-0114011

(51) Int. Cl.

| | |
|---|---|
| ***G06T 5/60*** | (2024.01) |
| ***G06T 5/20*** | (2006.01) |
| ***G06T 7/00*** | (2017.01) |
| ***G06T 7/60*** | (2017.01) |

(52) U.S. Cl.

CPC .............. *G06T 7/0002* (2013.01); *G06T 5/20* (2013.01); *G06T 7/60* (2013.01); *G06T 2207/10028* (2013.01); *G06T 2207/20081* (2013.01); *G06T 2207/30168* (2013.01)

(58) Field of Classification Search

CPC ........... G06T 7/0002; G06T 5/20; G06T 7/60; G06T 2207/10028; G06T 2207/20081; G06T 2207/30168; G06T 2207/20084; G06T 2207/30252; G06T 5/70; G06T 5/60; G06V 10/774; G06V 10/476; G06V 20/56

See application file for complete search history.

(56) References Cited

U.S. PATENT DOCUMENTS

2021/0004976 A1* 1/2021 Guizilini ................ G06N 20/00
2022/0148203 A1* 5/2022 Guizilini ................. G01S 17/86

* cited by examiner

*Primary Examiner* — Phuoc Tran

(74) *Attorney, Agent, or Firm* — Banner & Witcoff, Ltd.

(57) ABSTRACT

A learning device is introduced. The device may comprise a processor, and memory storing instructions that, when executed by the processor, may cause the device to obtain at least one first depth map based on at least one piece of cloud data associated with surrounding environment information, and at least one first image associated with the at least one first depth map, determine, based on the at least one first depth map and the at least one first image, variance estimation information indicating a variance between the at least one first depth map and the at least one first image, back-propagate a variance loss based on the first variance estimation information, and variance ground truth (GT) information associated with the first variance estimation information, and update, based on the back-propagated variance loss, a parameter associated with determining the first variance estimation information.

20 Claims, 14 Drawing Sheets

LEARNING DEVICE, LEARNING METHOD THEREOF, TEST DEVICE USING THE SAME, AND TEST METHOD USING THE SAME

CROSS-REFERENCE TO RELATED APPLICATION

This application claims the benefit of priority to Korean Patent Application No. 10-2023-0114011, filed in the Korean Intellectual Property Office on Aug. 29, 2023, the entire contents of which are incorporated herein by reference.

TECHNICAL FIELD

The present disclosure relates to a learning device, a learning method thereof, a test device using the same, and a test method using the same, and more particularly, relates to a learning device for constructing training data used to train another network, a learning method thereof, a test device using the same, and a test method using the same.

BACKGROUND

For deep neural network-based computer vision technology in an autonomous driving technology, various artificial intelligence models, such as object detection, semantic segmentation, depth estimation, and lane detection, may be considered.

For example, the depth estimation may be variously used to recognize surrounding situations and spaces for ambient objects, free spaces, and the like using cameras in an autonomous driving situation.

There is a need for a good-quality depth image for training, which is generated based on point cloud data obtained by means of a light detection and ranging (LiDAR) sensor, for training of a depth map estimation network which performs such a depth estimation operation.

A good-quality depth map for training may refer to a depth map in which consistency is high between a camera-based image and a LiDAR sensor-based depth map. The high consistency may mean that depth information at a specific position (e.g., pixel coordinates (50, 90)) on the depth map accurately represents depth information about a specific object which is present at the specific position (e.g., the pixel coordinates (50, 90)) on an image corresponding to the depth map.

However, consistency between the depth map and the image may be low due to various causes. For example, the consistency between the depth map and the image may be low due to an error in calibration for a difference between a position where LiDAR is mounted and a position where a camera is mounted, an error in calibration for correcting a camera distortion, or a difference in a relative speed between a moving object on which the LiDAR is mounted and a surround object.

For example, referring to FIG. 1A showing that consistency between a depth map and an image is low, it may be identified that pieces of point cloud data corresponding to a tree and a building are projected onto an incorrect position on the image. On the other hand, referring to FIG. 1B showing that consistency between a depth map and an image is high, it may be identified that pieces of point cloud data corresponding to a tree and a building are accurately projected onto a position of a corresponding object on the image.

If a depth map estimation network is trained using a depth map with low consistency, the accuracy of the depth map estimation network may be low. An inspector may separately inspect consistency of each of depth maps and select a good-quality depth map to prevent it. Due to this, a huge amount of time and cost may be consumed in constructing a large amount of good-quality depth maps for training.

SUMMARY

According to the present disclosure, a device may comprise: a processor; and memory storing instructions that, when executed by the processor, may cause the device to: obtain: at least one first depth map based on at least one piece of cloud data associated with surrounding environment information; and at least one first image associated with the at least one first depth map; determine, based on the at least one first depth map and the at least one first image, first variance estimation information indicating a variance between the at least one first depth map and the at least one first image; back-propagate a variance loss based on: the first variance estimation information; and variance ground truth (GT) information associated with the first variance estimation information; and update, based on the back-propagated variance loss, a parameter associated with determining the first variance estimation information.

The device, wherein the instructions, when executed by the processor, may cause the device to: apply an encoding operation to the at least one first depth map; obtain, based on the encoding operation, a first feature map corresponding to the at least one first depth map; apply a second encoding operation to the at least one first image; obtain, based on the second encoding operation, a second feature map corresponding to the at least one first image; generate an integrated feature map based on: the first feature map; and the second feature map; apply a decoding operation to the integrated feature map; and determine, based on the decoding operation, the first variance estimation information.

The device, wherein the first variance estimation information may comprise: width variance estimation information indicating a width variance; and height variance estimation information indicating a height variance, wherein the width variance and the height variance are variances between respective pixels of the at least one first depth map and respective pixels of the at least one first image, the respective pixels of the at least one first image corresponding to the respective pixels of the at least one first depth map.

The device, wherein the instructions, when executed by the processor, may cause the device to determine, based on second variance estimation information, suitability determination information indicating whether a second depth map is acceptable as training data for training of a depth map estimation network, wherein the second variance estimation information indicates a variance between the second depth map and a second image.

The device, wherein the instructions, when executed by the processor, may cause the device to: obtain the second variance estimation information; back-propagate a suitability loss based on: the suitability determination information; and suitability GT information associated with the suitability determination information; and update, based on the back-propagation of the suitability loss, a parameter associated with determining the suitability determination information.

The device, wherein the instructions, when executed by the processor, may cause the device to update a parameter associated with determining the suitability determination information based on a state in which the parameter, associated with determining the first variance estimation information, is fixed.

The device, wherein the instructions, when executed by the processor, may cause the device to: apply a suitability determination operation to the second depth map; generate, based on the suitability determination operation, first to n-th pieces of area suitability determination information respectively corresponding to first to n-th areas of the second depth map; and determine the suitability determination information based on the first to n-th pieces of area suitability determination information.

The device, wherein the instructions, when executed by the processor, may cause the device to: apply a noise addition operation to the at least one piece of cloud data; and generate, based on the noise addition operation, the at least one first depth map.

The device, wherein the instructions, when executed by the processor, may cause the device to: perform a filtering operation to remove data from the at least one piece of cloud data, the removed data corresponding to a position of the surrounding environment information; and generate, based on the filtering operation, the at least one first depth map.

The device (e.g., a learning device), wherein the instructions, when executed by the processor, may cause the device to generate, based on the updated parameter, another depth map having a higher accuracy than the at least one first depth map.

According to the present disclosure, a device may comprise: a processor; and memory storing instructions that, when executed by the processor, may cause the device to: obtain: a depth map for testing based on point cloud data associated with surrounding environment information for testing; and an image for testing associated with the depth map for testing; information determine variance estimation for testing indicating a variance between the depth map for testing and the image for testing; and determine, based on the variance estimation information for testing, suitability determination information for testing indicating whether the depth map for testing is acceptable for training of a depth map estimation network.

The method further may comprise generating, based on the training the depth map estimation network, another depth map having a higher accuracy than the depth map.

According to the present disclosure, a method may comprise: obtaining: at least one first depth map based on at least one piece of cloud data associated with surrounding environment information; and at least one first image associated with the at least one first depth map; determining, based on the at least one first depth map and the at least one first image, first variance estimation information indicating a variance between the at least one first depth map and the at least one first image; and back-propagating a variance loss based on: the first variance estimation information; and variance ground truth (GT) information associated with the first variance estimation information; updating, based on the back-propagating the variance loss, a parameter associated with determining the first variance estimation information; and generating, based on the updated parameter, another depth map having a higher accuracy than the at least one first depth map.

The method, wherein the determining the first variance estimation information may comprise: applying an encoding operation to the at least one first depth map; obtaining, based on the encoding operation, a first feature map corresponding to the at least one first depth map; applying a second encoding operation to the at least one first image; obtaining, based on the second encoding operation, a second feature map corresponding to the at least one first image; generating an integrated feature map based on: the first feature map; and the second feature map; applying a decoding operation to the integrated feature map; and determining, based on the decoding operation, the first variance estimation information.

The method, wherein the first variance estimation information may comprise: width variance estimation information indicating a width variance; and height variance estimation information indicating a height variance, wherein the width variance and the height variance are variances between respective pixels of the at least one first depth map and respective pixels of the at least one first image, the respective pixels of the at least one first image corresponding to the respective pixels of the at least one first depth map.

The method, further may comprise, after updating the parameter associated with determining the first variance estimation information: obtaining second variance estimation information indicating a variance between a second depth map and a second image; determining, based on the second variance estimation information, suitability determination information indicating whether the second depth map is acceptable as training data for training of a depth map estimation network; back-propagating a suitability loss based on: the suitability determination information; and suitability GT information associated with the suitability determination information; and updating, based on the back-propagating the suitability loss, a parameter associated with a determination of the suitability determination information.

The method, wherein the parameter, associated with determining the first variance estimation information, is fixed.

The method, wherein the determining the suitability determination information may comprise: applying a suitability determination operation to the second depth map; generating, based on the suitability determination operation, first to n-th pieces of area suitability determination information respectively corresponding to first to n-th areas of the second depth map; and determining the suitability determination information based on the first to n-th pieces of area suitability determination information.

The method, further may comprise, before obtaining the at least one first depth map and the at least one first image: performing a noise addition operation on the at least one piece of cloud data; and generating, based on the noise addition operation, the at least one first depth map.

The method, wherein the generating the at least one first depth map may comprise: performing a filtering operation to remove data from the least one piece of cloud data, the removed data corresponding to a position of the surrounding environment information; and generating, based on the filtering operation, the at least one first depth map.

The method further may comprise, generating, based on the updated parameter, another depth map having a higher accuracy than the at least one first depth map.

According to the present disclosure, a method may comprise: obtaining: a depth map for testing based on point cloud data associated with surrounding environment information for testing; and an image for testing associated with the depth map for testing; determining, based on the depth map for testing and the image for testing, variance estimation information for testing indicating a variance between the depth map for testing and the image for testing; and determining, based on the variance estimation information for testing, suitability determination information for testing indicating whether the depth map for testing is acceptable for training of a depth map estimation network.

The method further may comprise generating, based on the training the depth map estimation network, another depth map having a higher accuracy than the depth map.

BRIEF DESCRIPTION OF THE DRAWINGS

The above and other objects, features and advantages of the present disclosure will be more apparent from the following detailed description taken in conjunction with the accompanying drawings.

Figure 1A:
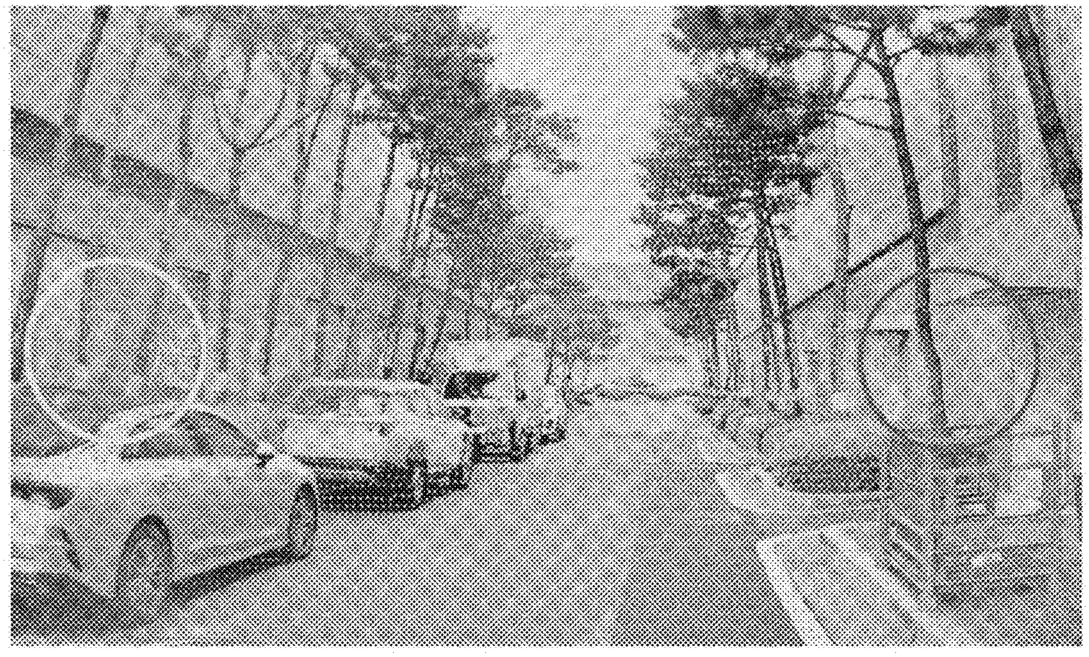
FIGS. 1A and 1B show examples of consistency between a depth map and an image.
Figure 1B:
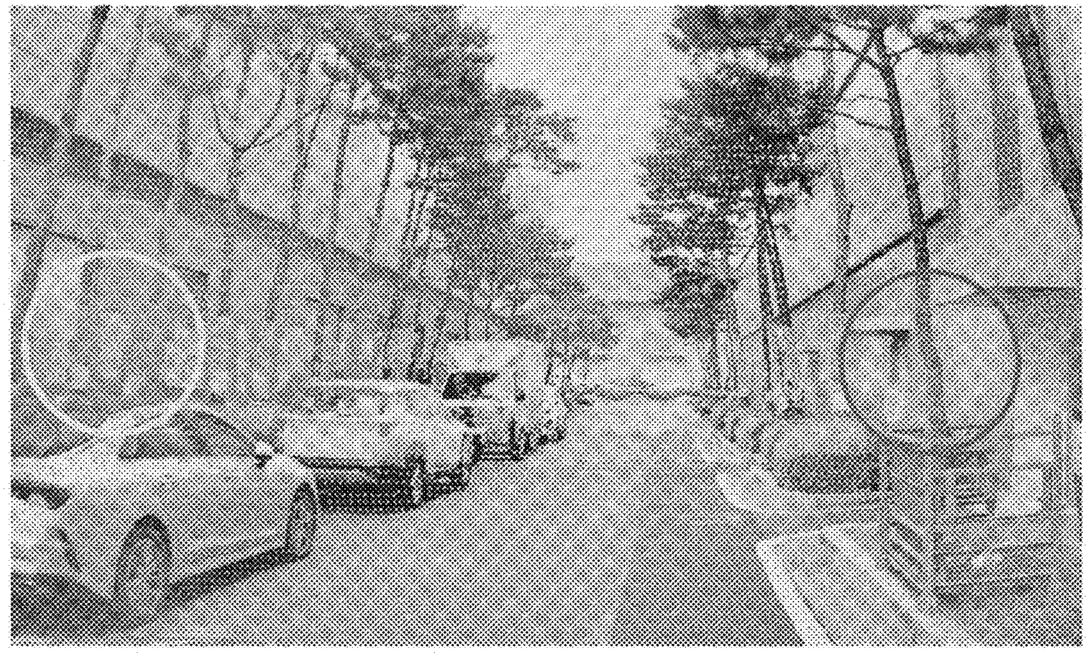

With regard to description of drawings, the same or similar denotations may be used for the same or similar components.

DETAILED DESCRIPTION

Hereinafter, some examples of the present disclosure will be described in detail with reference to the accompanying drawings. In adding the reference numerals to the components of each drawing, it should be noted that the identical component is designated by the identical numerals even when they are displayed on other drawings. Further, in describing the example of the present disclosure, a detailed description of well-known features or functions will be ruled out in order not to unnecessarily obscure the gist of the present disclosure.

In describing the components of the example according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as such in having the present application.

Hereinafter, examples of the present disclosure will be described in detail with reference to FIGS. 2 to 11.

Figure 2:
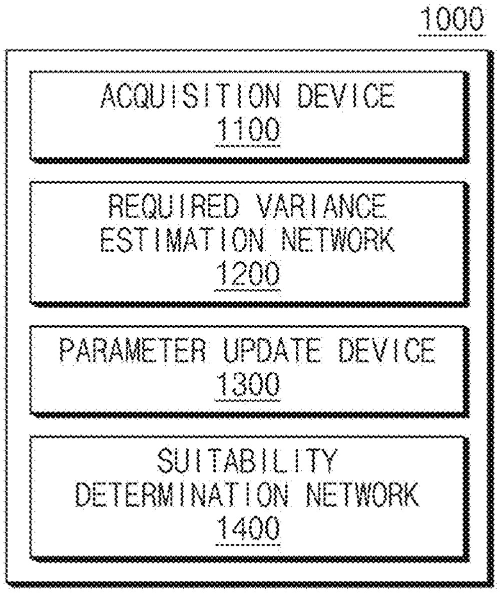
FIG. 2 show an example of a configuration of a learning device according to an example disclosed present disclosure.

FIG. 2 show an example of a configuration of a learning device 1000 according to an example disclosed in the present disclosure. FIGS. 3 to 7 show examples of an operation of a learning device according to an example disclosed in the present disclosure.

Referring to FIG. 2, the learning device 1000 may include an acquisition device 1100, a variance estimation network 1200, a parameter update device 1300, and a suitability determination network 1400.

Furthermore, the learning device 1000 may additionally include a training depth map generator (not shown) for generating a first depth map for training and/or a second depth map for training. For reference, the first depth map for training may be training data used to train the variance estimation network 1200 which will be described below, and the second depth map for training may be training data used to train the suitability determination network 1400 which will be described below.

For helping understanding, a process of generating the first depth map for training will first be described, and other components of the learning device 1000 will then be described.

Figure 3:
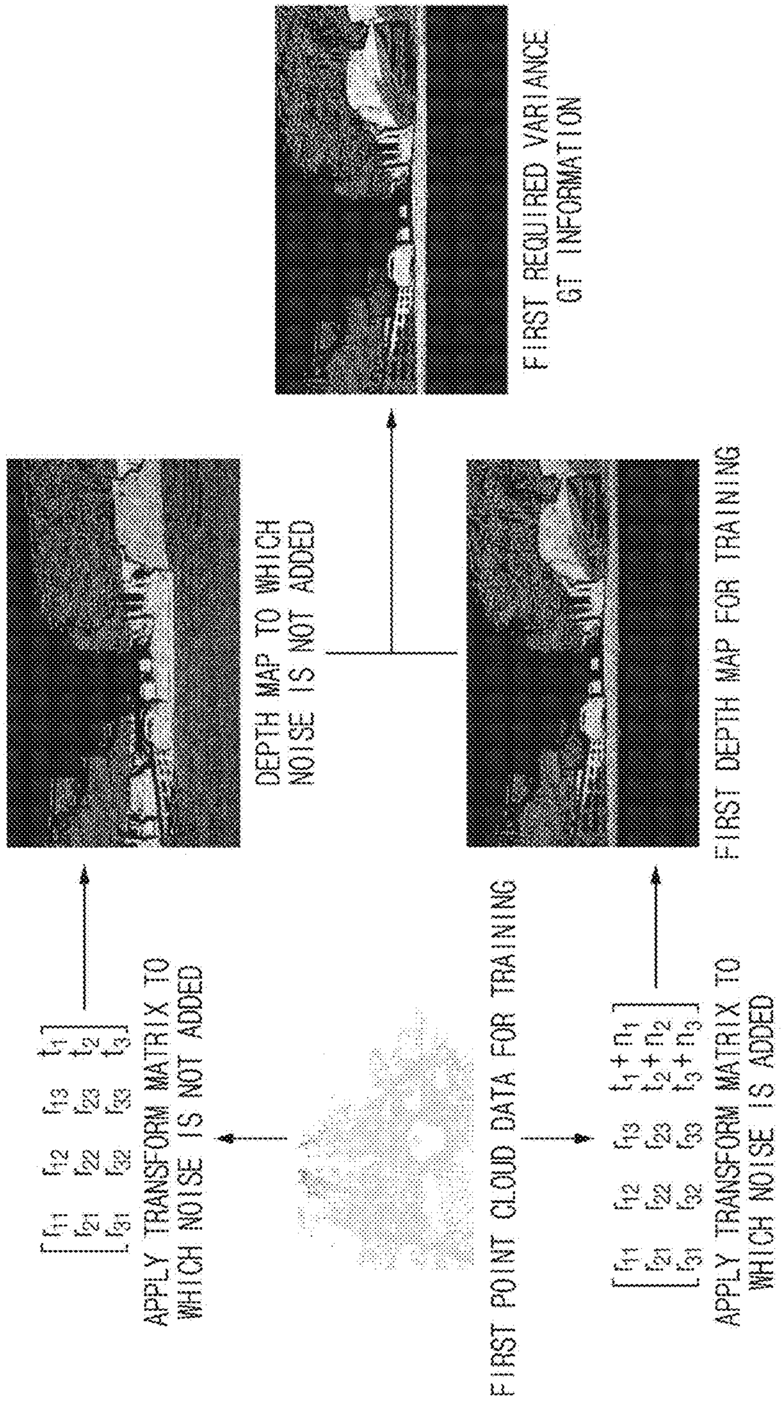
FIGS. 3, 4A, 4B, 4C, 5, 6, and 7 show examples of an operation of a learning device according to an example disclosed in the present disclosure.

Reference to FIG. 3. the training depth map generator may apply noise addition operation to at least some of pieces of first point cloud data for training, which are obtained in a plurality of environments, at a plurality of time points, in a plurality of spaces, or the like, to generate the first depth map for training. At this time, the first point cloud data for training may be point cloud data with excellent consistency with a corresponding image.

For example, a transform matrix (e.g., an extrinsic matrix) may be used in converting the first point cloud data for training in a coordinate system corresponding to a light detection and ranging (LiDAR) sensor into a coordinate system corresponding to a camera. At this time, the training depth map generator may add noise terms $n_1$, $n_2$, $n_3$ and the like to the transform matrix to generate the first depth map for training for training the variance estimation network.

For reference, when a depth map generated by applying a transform matrix to which noise is not added (i.e., a depth map to which noise is not added) is compared with the first depth map for training in FIG. 3, although the depth map and the first depth map for training are depth maps generated from the same point cloud data, it may be identified that positions on the respective depth maps for the same object are different from each other. In other words, the first depth map for training may be a depth map in which noise is intentionally added to move a position of the object for training of the variance estimation network.

At this time, the first depth map for training may be generated based on a specific first point cloud data for training, which is included in the field of view (FOV) of the camera, among pieces of first point cloud data for training, coordinates of which are converted into a camera coordinate system.

First variance ground truth (GT) information may be generated based on the depth map to which noise is not added and the first depth map for training.

In other words, the first variance GT information may include information about a variance (or displacement) for each pixel on the first depth map for training to move to a position of each corresponding pixel on the depth map to which the noise is not added.

For example, the first variance GT information may be a map with two channels. At this time, one channel (e.g., a first channel) between the two channels may include variance information corresponding a width direction (or a horizontal direction; width), and the other channel (e.g., a second channel) may include variance information corresponding to a height direction (or a vertical direction; height).

For example, for a vehicle located just to the left of the center of the first depth map for training in FIG. 3 to move to a position of the same vehicle in the depth map to which the noise is not added, the vehicle should move by certain pixels (e.g., 10 pixels) in a left direction (or −width direction) and certain pixels (e.g., 30 pixels) in a lower direction (or −height direction). Thus, a value corresponding to a pixel on which the vehicle is located may be −10, in a first channel map of the first variance GT information (e.g., a channel map corresponding to a width variance), and a value corresponding to a pixel on which the vehicle is located may be −30 in a second channel map (e.g., a channel map corresponding to a height variance).

For reference, the first depth map for training to which the noise is added is illustrated for helping understanding in FIG. 3, but noise is not necessarily added to the first depth map for training, which is generated according to an example disclosed in the present disclosure. For example, noise may be added to 80 of 100 first depth maps for training, and noise fail to be added to 20 of the 100 first depth maps for training.

Furthermore, the training depth map generator may additionally apply filtering operation for removing specific first point cloud data for training, which corresponds to a specific position of first surrounding environment information, among the pieces of first point cloud data for training to generate the first depth map for training. For reference, the specific position of the first surrounding environment information may be a position which is not sensed by the camera, whereas the specific position of the first surrounding environment information may be a position which is sensed by the LiDAR sensor due to a difference between a position where the camera is mounted and a position where the LiDAR sensor is mounted.

Figure 4A:
Figure 4B:
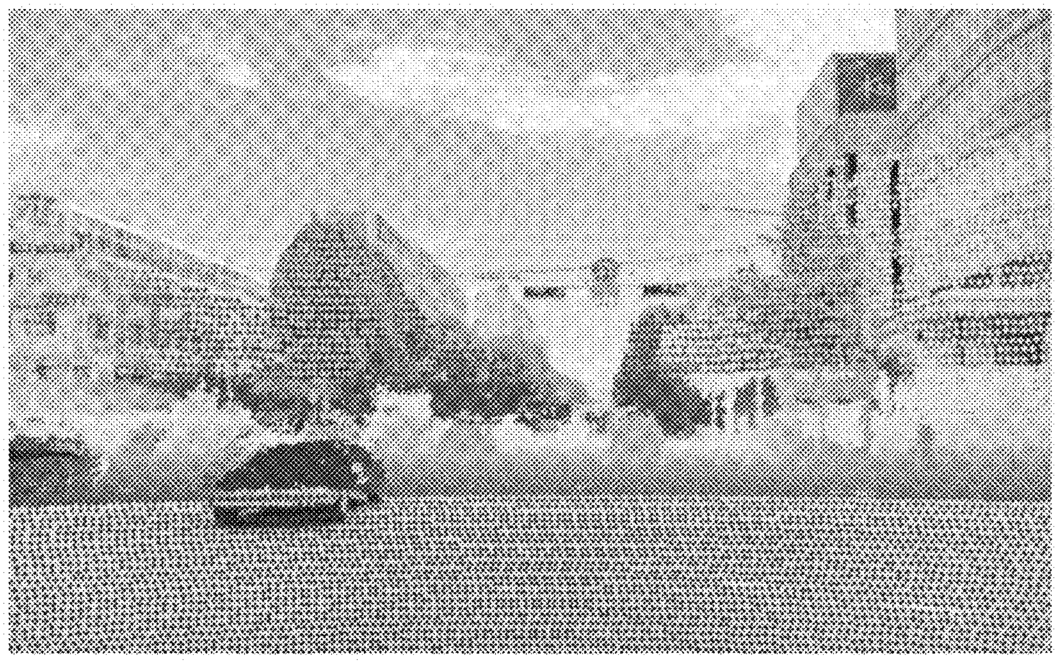
Figure 4C:
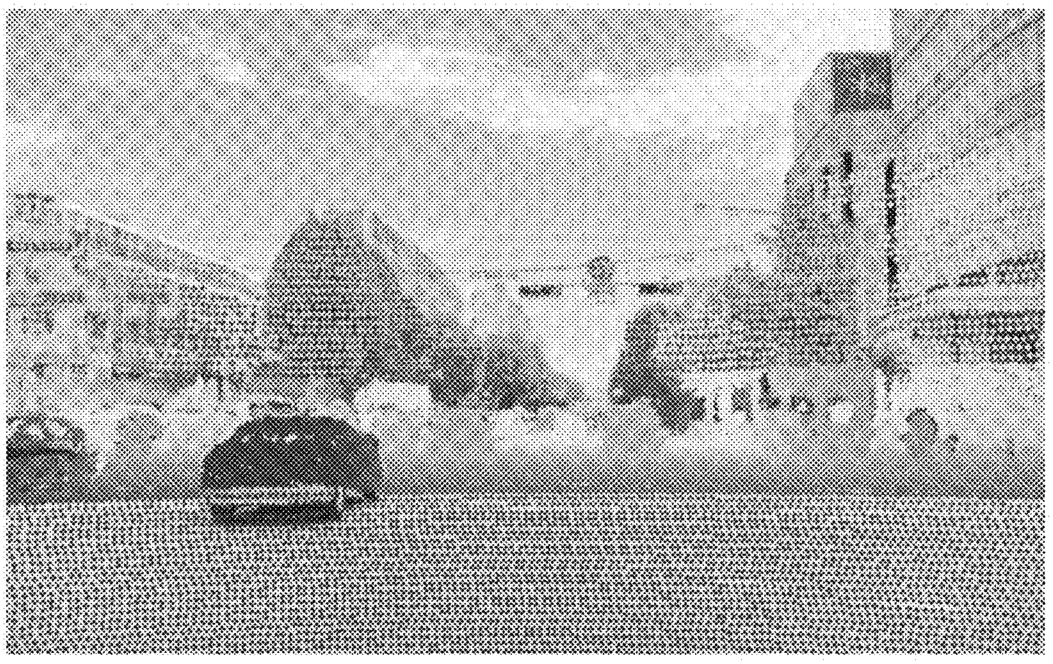

Referring to FIG. 4A, an image generated by sensing first surrounding environment information about a specific place at a specific time by means of the camera may be identified. Furthermore, referring to FIG. 4B, a depth map generated by sensing the first surrounding environment information by means of the LiDAR sensor may be identified. It may be identified that a second object which is located behind a first object and is not shown at the position of the camera is also sensed by the LiDAR sensor. In such a case, as shown in FIG. 4C, point cloud data (i.e., specific first point cloud data for training) corresponding to the position which is not shown at the position of the camera may be removed to allow the depth map to include information which is more similar to an image.

For example, a convex hull algorithm or statistical noise filtering may be used as a filtering technology for removing the specific first point cloud data for training.

The description is given above of the example in which the training depth map generator of the learning device generates the first depth map for training and the first variance GT information corresponding to the first depth map for training. Hereinafter, a description will be given of the components included in the learning device.

The acquisition device may obtain at least one first depth map for training based on at least one piece of first point cloud data for training for at least one piece of first surrounding environment information and at least one first image for training, which corresponds to the at least one first depth map for training.

For reference, each of the at least one piece of first surrounding environment information may differ in time and/or space information from each other. Furthermore, the first depth map for training and the first image for training, which corresponds to the first depth map for training, may be pieces of data for the same surrounding environment information (i.e., the same place at the same time point or in the same time interval).

The variance estimation network may output first variance estimation information for the first depth map to match the first image for training, based on the first depth map for training and the first image for training.

Figure 5:
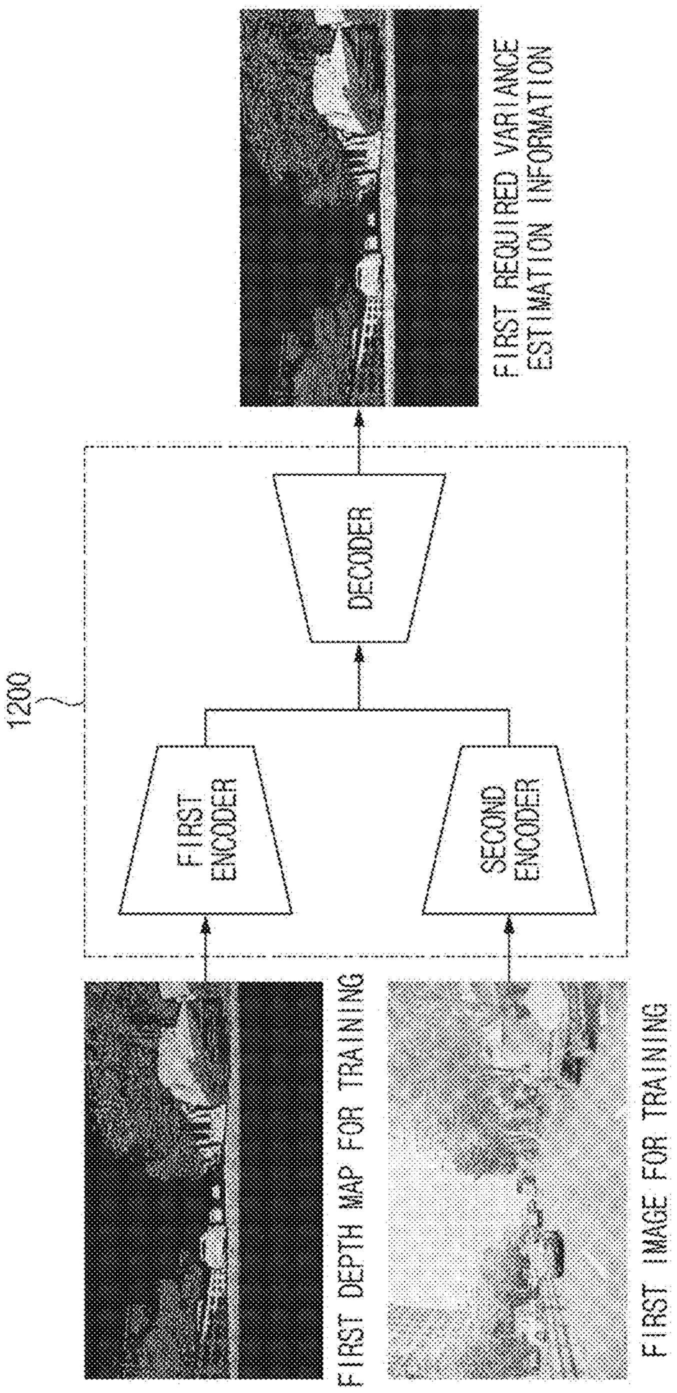

At this time, as shown in FIG. 5, the variance estimation network may apply first encoding operation to the first depth map for training to obtain a feature map corresponding to the first depth map for training by means of a first encoder, may apply second encoding operation to the first image for training to obtain a feature map corresponding to the first image for training by means of a second encoder, may generate an integrated feature map using the feature map corresponding to the first depth map for training and the feature map corresponding to the first image for training, and may apply decoding operation to the integrated feature map to output the first variance estimation information by means of a decoder. At this time, the feature map corresponding to the first depth map for training and the feature map corresponding to the first image for training may be concatenated to generate the integrated feature map.

For reference, a network mainly used in a scene estimation task, for example, Resnet 50, may be used in the first encoder and the second encoder, but this only helps understanding. The present disclosure is not limited thereto. Furthermore, a decoder for performing an up-sampling operation using a feature map may be used as the decoder.

At this time, the variance estimation network may output first width variance estimation information and first height variance estimation information for respective pixels of the first depth map for training to match respective pixels of the first image for training, which correspond to the respective pixels of the first depth map for training, as the first variance estimation information. In other words, the first variance estimation information may be a map with two channels. For reference, because the description of the first variance estimation information is similar to the description of the first variance GT information described above with reference to FIG. 3, a duplicated description thereof will be omitted.

The parameter update device may back-propagate a variance loss based on the first variance estimation information and the first variance GT information corresponding to the first variance estimation information to update a parameter of the variance estimation network. For reference, a loss (e.g., L1 loss) mainly used in the scene estimation task may be used as the variance loss.

As a result, the variance estimation network may be trained to accurately output displacement information (i.e., the first variance estimation information) necessary for the input depth map to match an image corresponding to the depth map.

Meanwhile, the learning device may additionally include the suitability determination network 1400.

For example, the suitability determination network may output suitability determination information corresponding to whether a second depth map for training is suitable as training data for training of another network (e.g., a depth map estimation network), based on the second variance estimation information for the second depth map for training to match a second image for training. For reference, the second depth map for training may be the same as, but not limited to, a portion of the first depth map for training.

At this time, the suitability determination network may output suitability determination information for each area of the second depth map for training.

For example, the suitability determination network may apply suitability determination operation to the second depth map for training to generate first to nth pieces of area suitability determination information respectively corresponding to first to nth areas of the second depth map for training and may output suitability determination information based on the first to nth pieces of area suitability determination information.

For example, the suitability determination network may apply convolution operation and classification operation to the second variance estimation information corresponding to the second depth map for training.

Figure 6:
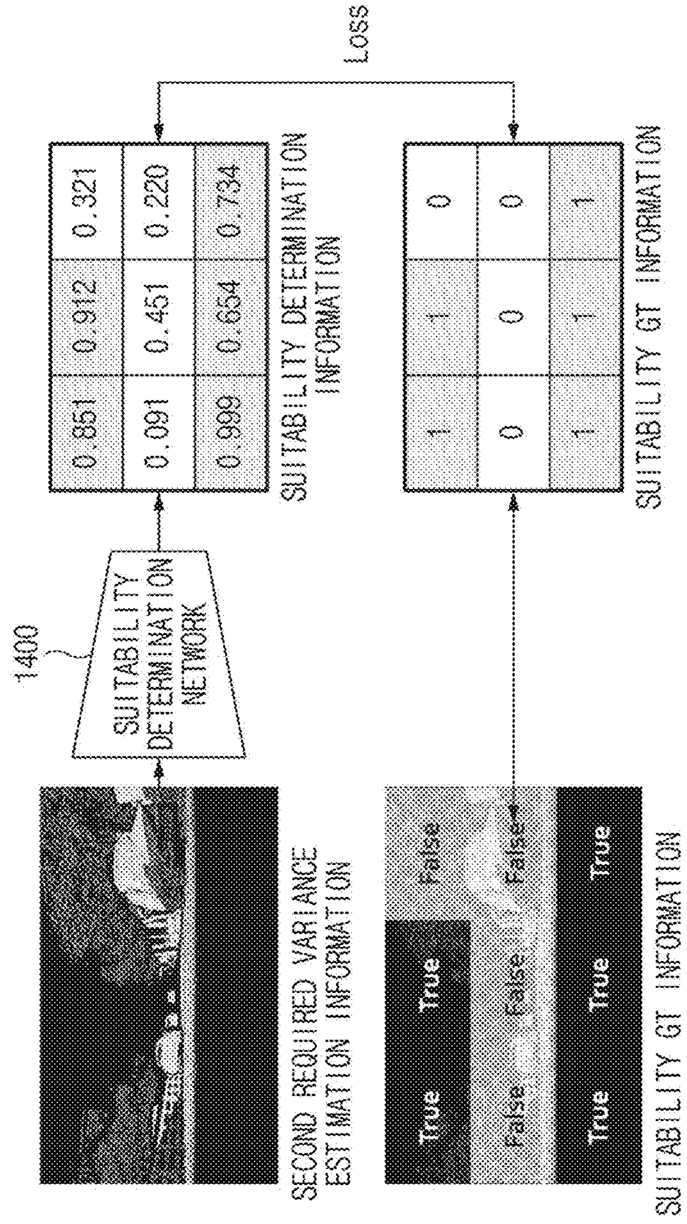

Referring to FIG. 6, when second variance estimation information with 192*192*2 size (which is an exemplary numerical value for helping understanding) is obtained, the suitability determination network may apply convolution operation and classification operation to the second variance estimation information to output suitability determination information with 3*3*1 size. At this time, a receptive field (or patch) of each pixel of the suitability determination information may be 64*64*2. This may be the result of performing suitability determination for a 64*64*2 area (or patch) of the second depth map for training, which corresponds to a value of a specific value of the suitability determination information in the suitability determination network 1400.

For reference, FIG. 6 illustrates the second variance estimation information with the same value as the first variance estimation information of FIG. 5 for convenience of description. However, the second variance estimation information disclosed in the present disclosure is not necessarily the same as the first variance estimation information.

For example, a value of 0.851 of a pixel located on a left upper end of the suitability determination information may mean that a variance in an area (or a patch) with 64*64*2 size, which is located on a left upper end of the second depth map for training, which corresponds to the value of 0.851, is low (i.e., that consistency with a corresponding image is high).

On the other hand, a value of 0.220 of a pixel located at the left of a middle row of the suitability determination information may mean that a variance in an area (or a patch) with 64*64*2 size, which is located at the right the second depth map for training, which corresponds to the value of 0.851, is high (i.e., that consistency with a corresponding image is low).

Figure 7:
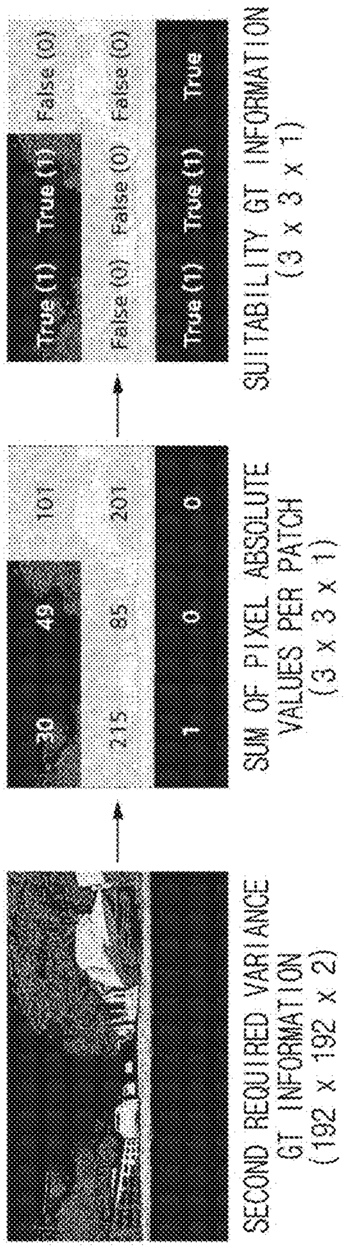

Meanwhile, a description will be illustratively given of a scheme in which suitability GT information shown in a lower end of FIG. 6 with reference to FIG. 7. For reference, FIG. 7 illustrates the second variance GT information with the same value as the first variance GT information of FIG. 3 for convenience of description. However, the second variance GT information disclosed in the present disclosure is not necessarily the same as the first variance GT information.

Referring to FIG. 7, when the magnitude of the second variance GT information is 192*192*2, like those described with reference to FIG. 6, suitability GT information may be generated for each area (or patch).

For example, the result of adding second variances in a left upper area (64*64*2) of second variance GT information may be 30. Furthermore, when the threshold is set to 50, because the sum of adding the variances in the area, 30, is less than a threshold, 50, it may be determined that the corresponding area (or patch) of the second depth map for training has high consistency with an image. A value of 1 for the area (or patch) (i.e., a GT value meaning that consistency is high) may be assigned.

On the other hand, the result of adding second variances in a right area (64*64*2) of the center of the second variance GT information may be 201. When the threshold is set to 50, because the sum of adding the variances in the area, 201, is greater than the threshold, 50, it may be determined that the area (or patch) of the second depth map for training has low consistency with an image. A value of 0 for the area (or patch) (i.e., a GT value meaning that consistency is low) may be assigned.

The parameter update device may back-propagate a suitability loss based on suitability determination information output from the suitability determination network and suitability GT information corresponding to the suitability determination information to further update a parameter of the suitability determination network. For reference, a loss (e.g., binary cross entropy or the like) mainly used in classification operation may be used as the suitability loss.

For example, the parameter update device may back-propagate a suitability loss based on first to nth pieces of area suitability determination information output from the suitability determination network and first to nth pieces of area suitability GT information respectively corresponding to the first to nth pieces of area suitability determination information to further update a parameter of the suitability determination network.

At this time, the parameter update device may additionally update a parameter of the suitability determination network in a state in which the parameter of the variance estimation network is freezing.

Figure 8:
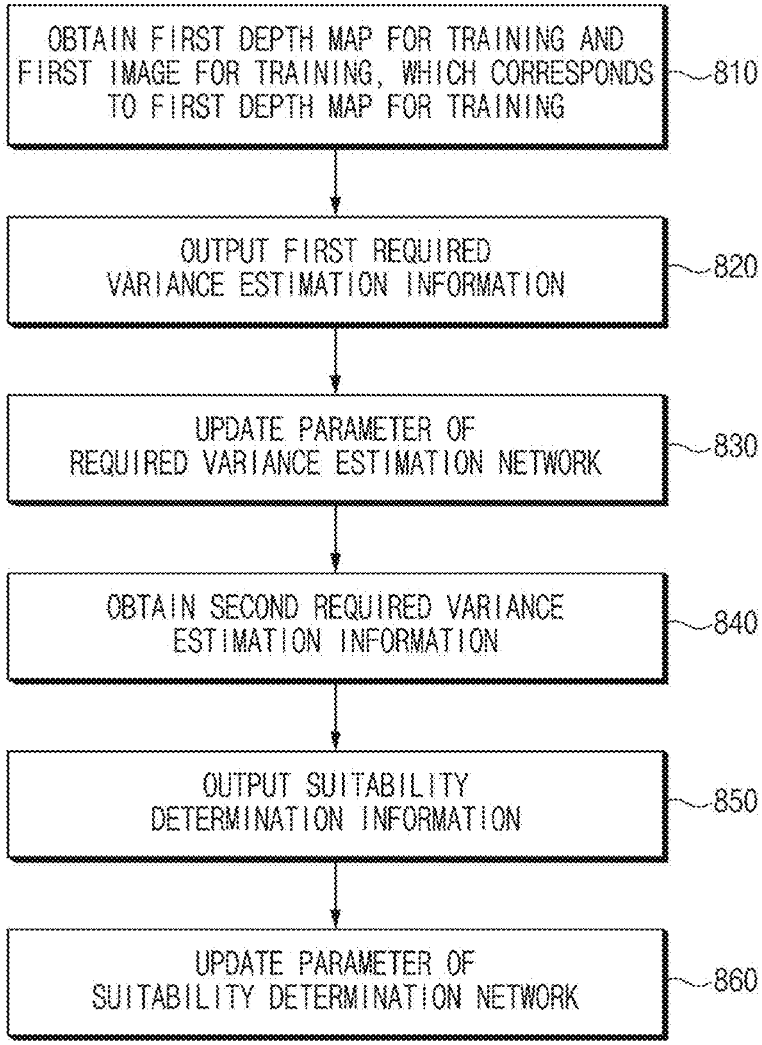
FIG. 8 show an example of a learning method according to an example disclosed in the present disclosure.

FIG. 8 is a flowchart illustrating an operation of a learning device.

Referring to FIG. 8, in operation 810, at least one first depth map for training based on at least one piece of first point cloud data for training for at least one piece of first surrounding environment information and at least one first image for training, which corresponds to the at least one first depth map for training, may be obtained.

In operation 820, first variance estimation information for the first depth map for training to match the first image for training may be output based on the first depth map for training and the first image for training.

In operation 830, a variance loss based on the first variance estimation information and first variance GT information corresponding to the first variance estimation information may be back-propagated to update a parameter of a variance estimation network which outputs the first variance estimation information.

In operation 840, second variance estimation information for a second depth map for training to match a second image for training may be obtained. At this time, the y be estimation second variance estimation information information generated based on the same depth map and image as the first depth map for training and the first image for training in operation 810. However, because the second variance estimation information is estimation information generated by the variance estimation network, the training of which is completed, although the second variance estimation information is generated based on the same depth map and image, it may be higher in accuracy than the first variance estimation information generated during the training of the variance estimation network.

In operation 850, suitability determination information corresponding to whether the second depth map for training is suitable as training data for training of a depth map estimation network may be output, based on the second variance estimation information.

In operation 860, a suitability loss based on the suitability determination information and suitability GT information corresponding to the suitability determination information may be back-propagated to update a parameter of the suitability determination network which output the suitability determination information.

Meanwhile, a description will be given below of a configuration of a test device 2000 including a network, a parameter of which is updated, using the learning device described above with reference to FIG. 9. For reference, a description duplicated with the same or similar description to the learning device will be omitted.

Figure 9:
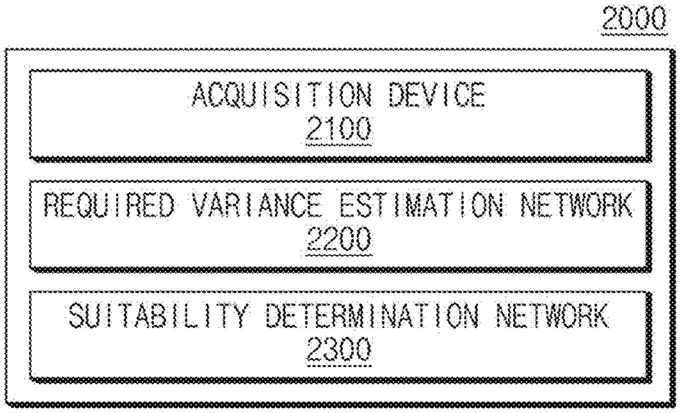
FIG. 9 show an example of a configuration of a test device according to an example disclosed in the present disclosure.

FIG. 9 show an example of a configuration of a test device 2000 according to an example disclosed in the present disclosure.

Referring to FIG. 9, the test device 2000 according to an example disclosed in the present disclosure may include an acquisition device 2100, a variance estimation network 2200, and a suitability determination network 2300.

For example, the acquisition device 2100 may obtain a depth map for testing based on point cloud data for testing for surrounding environment information for testing and an image for testing, which corresponds to the depth map for testing. For reference, the acquisition device 2100 may be the same as an acquisition device 1100 of a learning device 1000 shown in FIG. 2.

The variance estimation network 2200 may output variance estimation information for testing for the depth map for testing to match the image for testing, based on the depth map for testing and the image for testing.

The suitability determination network 2300 may output suitability determination information for testing, which indicates whether the depth map for testing is suitable for training of a depth map estimation network, based on the variance estimation information for testing.

Figure 10:
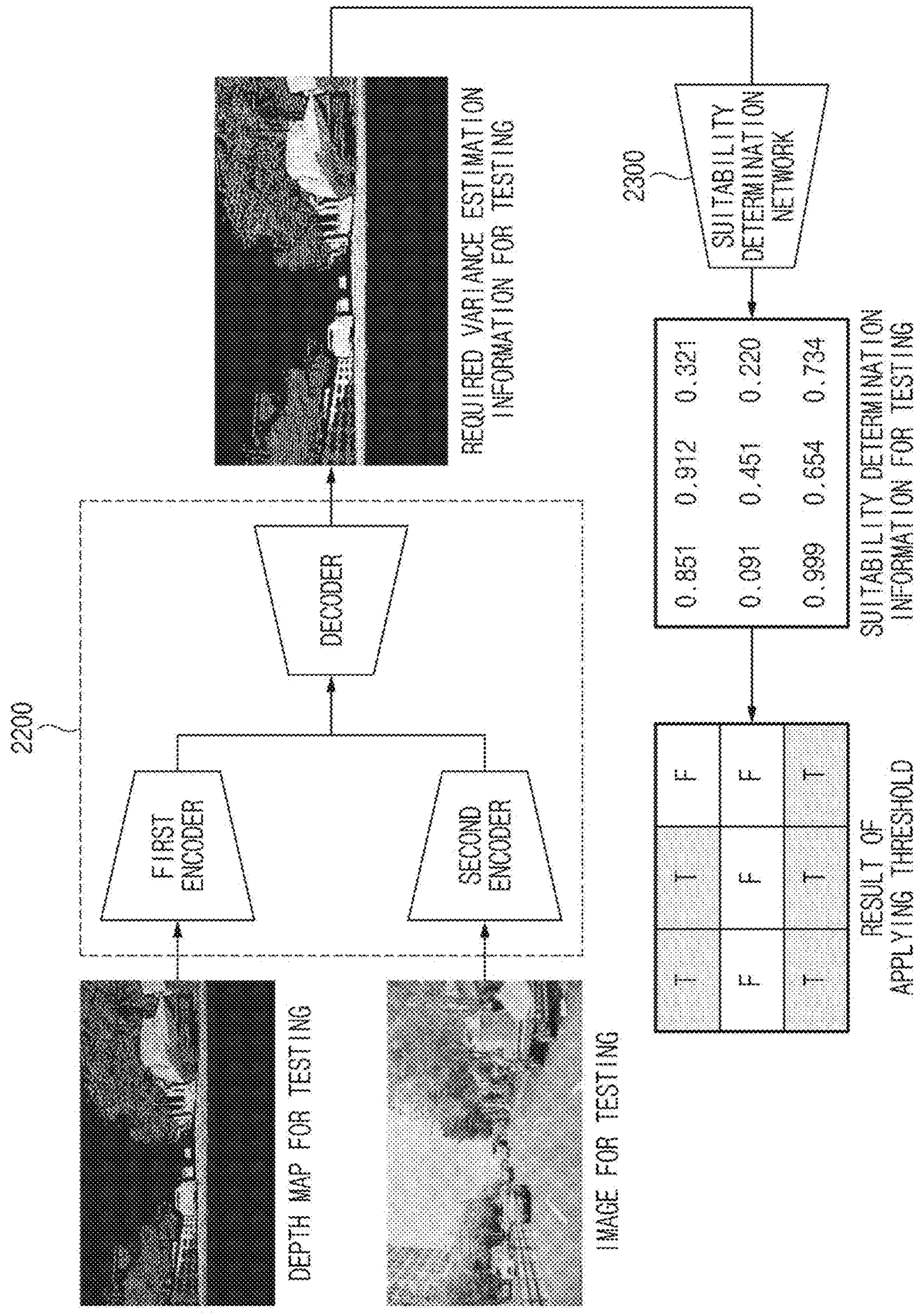
FIG. 10 show an example of an operation of a test device according to an example disclosed in the present disclosure.

FIG. 10 is a drawing illustrating an operation of a test device.

Referring to FIG. 10, when a depth map for testing and an image for testing are obtained, a variance estimation network 2200 may apply first encoding operation to the depth map for testing to obtain a feature map corresponding to the depth map for testing by means of a first encoder, may apply second encoding operation to the image for testing to obtain a feature map corresponding to the image for testing by means of a second encoder, may generate an integrated feature map for testing using the feature map corresponding to the depth map for testing and the feature map corresponding to the image for testing, and may apply decoding operation to the integrated feature map for testing to output variance estimation information for testing by means of a decoder. At this time, the feature map corresponding to the depth map for testing and the feature map corresponding to the image for testing may be concatenated to generate the integrated feature map.

A suitability determination network 2300 may output suitability determination information for testing, which indicates whether the depth map for testing is suitable for training of another network (e.g., a depth map estimation network) based on the variance estimation information for testing. For example, as shown in FIG. 10, suitability determination information for testing may be output for 7 areas.

A test device may allow a filter device (not shown) to compare suitability determination information for testing with a threshold (e.g., 0.5) to classify suitability (true or false) for each area. For example, because suitability determination information for testing in the first area, 0851, is greater than a threshold, 0.5, suitability corresponding to the first area may be classified as being true. On the other hand, because suitability determination information for testing in the third area, 0.321, is less than the threshold, 0.5, suitability corresponding to the third area may be classified as being false.

The test device may determine whether certain point cloud data for testing or a certain depth map for testing is suitable as training data for training of another network, based on the suitability classified for each area.

For example, when there are one or more areas classified as being false among all the areas, the test device may determine that the point cloud data for testing or the depth map for testing is unsuitable as training data.

For another example, if the ratio of the area classified as being false to all the areas is less than the threshold, the test device may determine that the point cloud data for testing or the depth map for testing is suitable as training data.

Figure 11:
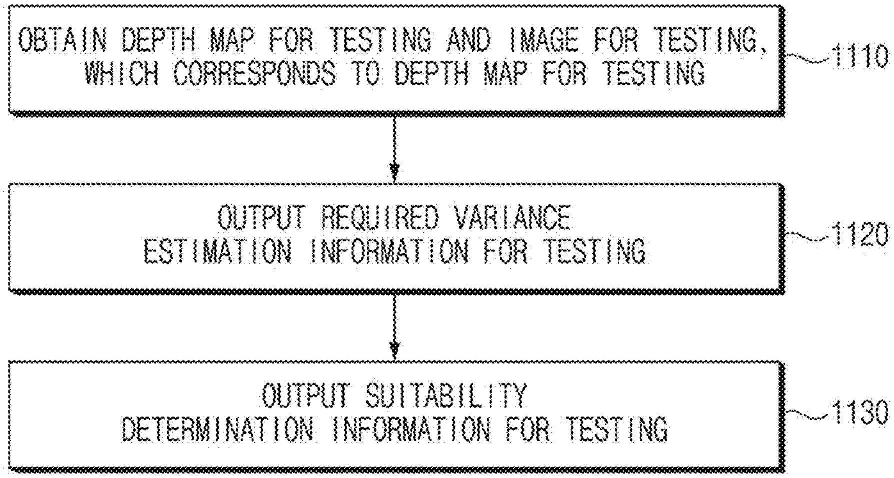
FIG. 11 show an example of a test method according to an example disclosed in the present disclosure.

FIG. 11 is a flowchart illustrating an operation of a test device.

Referring to FIG. 11, in operation 1110, a depth map for testing based on point cloud data for testing for surrounding environment information for testing and an image for testing, which corresponds to the depth map for testing, may be obtained.

In operation 1120, variance estimation information for testing for the depth map for testing to match the image for testing may be output based on the depth map for testing and the image for testing.

In operation 1130, suitability determination information for testing, which indicates whether the depth map for testing is suitable for training of a depth map estimation network, may be output based on the variance estimation information for testing.

As a result, it may be accurately determined whether any of depth maps which are training data used to train another network (e.g., a depth map estimation network) has high consistency with the image. Thus, an inspector may effectively select data for constructing a training dataset, even without passing through a process of consuming a huge amount of time and cost to inspect the depth maps.

Additionally or alternatively, it is understood that one or more of the following methods or examples thereof may be executed by one or more processors. The learning device 1000 may be implemented as a hardware device that includes a memory and a processor. The memory is configured to store program instructions, and the processor is specifically programmed to execute the program instructions to perform one or more of the processes described in more detail below. The learning device 1000 may control the operation of units, modules, components, devices, or the like, as described herein. It is understood that the methods below may be carried out by an apparatus comprising the learning device 1000 in conjunction with one or more other components, as recognized by those skilled in the art.

In addition or alternative, the learning device 1000 of the present disclosure may be implemented as a non-transitory computer-readable recording medium including executable program instructions executed by a processor. Examples of computer-readable recording media include, but are not limited to, ROMs, RAMs, compact disc (CD) ROMS, magnetic tapes, floppy disks, flash drives, smart cards, and optical data storage devices.

The present disclosure has been made to solve the above-mentioned problems s occurring in the prior art while advantages achieved by the prior art are maintained intact.

An example of the present disclosure provides a learning device for constructing training data used to train a depth map estimation network, a learning method thereof, a test device using the same, and a test method using the same.

Another example of the present disclosure provides a learning device for outputting variance estimation information about a variance necessary for a depth map to match an image, a learning method thereof, a test device using the same, and a test method using the same.

Another example of the present disclosure provides a learning device for outputting suitability determination information corresponding to whether a depth map is suitable as training data for training of a depth map estimation network, a learning method thereof, a test device using the same, and a test method using the same.

Another example of the present disclosure provides a learning device for reducing time and cost consumed to construct training data for training of the depth map estimation network, a learning method thereof, a test device using the same, and a test method using the same.

Another example of the present disclosure provides a learning device for effectively selecting data to construct training data for training of a depth map estimation network, a learning method thereof, a test device using the same, and a test method using the same.

The technical problems to be solved by the present disclosure are not limited to the aforementioned problems, and any other technical problems not mentioned herein will be clearly understood the following description by those skilled in the art to which the present disclosure pertains.

According to an example of the present disclosure, a learning device may include an acquisition device that obtains at least one first depth map for training based on at least one piece of first point cloud data for training for at least one piece of first surrounding environment information and at least one first image for training, the at least one first image corresponding to the at least one first depth map for training, a variance estimation network that outputs first variance estimation information for the first depth map for training to match the first image for training, based on the first depth map for training and the first image for training, and a parameter update device that back-propagates a variance loss based on the first variance estimation information and first variance ground truth (GT) information corresponding to the first variance estimation information to update a parameter of the variance estimation network.

In an example, the variance estimation network may apply first encoding operation to the first depth map for training to obtain a feature map corresponding to the first depth map for training, may apply second encoding operation to the first image for training to obtain a feature map corresponding to the first image for training, may generate an integrated feature map using the feature map corresponding to the first depth map for training and the feature map corresponding to the first image for training, and may apply decoding operation to the integrated feature map to output the first variance estimation information.

In an example, the variance estimation network may output first width variance estimation information and first height variance estimation information for respective pixels of the first depth map for training to match respective pixels of the first image for training, the respective pixels corresponding to the respective pixels of the first depth map for training, as the first variance estimation information.

In an example, the learning device may further include a suitability determination network that outputs suitability determination information corresponding to whether a second depth map for training is suitable as training data for training of a depth map estimation network, based on second variance estimation information for the second depth map for training to match a second image for training.

In an example, the acquisition device may further obtain the second variance estimation information. The parameter update device may back-propagate a suitability loss based on the suitability determination information and suitability GT information corresponding to the suitability determination information to further update a parameter of the suitability determination network.

In an example, the parameter update device may additionally update a parameter of the suitability determination network, in a state in which the parameter of the variance estimation network is fixed.

In an example, the suitability determination network may apply suitability determination operation to the second depth map for training to generate first to nth pieces of area suitability determination information respectively corresponding to first to nth areas of the second depth map for training and may output the suitability determination information based on the first to nth pieces of area suitability determination information.

In an example, the learning device may further include a training depth map generator that applies noise addition operation to some of the at least one piece of first point cloud data for training to generate the first depth map for training.

In an example, the training depth map generator may additionally apply filtering operation for removing specific first point cloud data for training, the specific first point cloud data corresponding to a specific position of the first surrounding environment information, among the at least one piece of first point cloud data for training to generate the first depth map for training.

According to another example of the present disclosure, a test device may include an acquisition device that obtains a depth map for testing based on point cloud data for testing for surrounding environment information for testing and an image for testing, the image corresponding to the depth map for testing, a variance estimation network that outputs variance estimation information for testing for the depth map for testing to match the image for testing, based on the depth map for testing and the image for testing, and a suitability determination network that outputs suitability determination information for testing, the suitability determination information indicating whether the depth map for testing is suitable for training of a depth map estimation network, based on the variance estimation information for testing.

According to another example of the present disclosure, a learning method may include obtaining at least one first depth map for training based on at least one piece of first point cloud data for training for at least one piece of first surrounding environment information and at least one first image for training, the at least one first image corresponding to the at least one first depth map for training, outputting first variance estimation information for the first depth map for training to match the first image for training, based on the first depth map for training and the first image for training, and back-propagating a variance loss based on the first variance estimation information and first variance ground truth (GT) information corresponding to the first variance estimation information to update a parameter of a variance estimation network for outputting the first variance estimation information.

In an example, the outputting of the first variance estimation information may include applying first encoding operation to the first depth map for training to obtain a feature map corresponding to the first depth map for training, applying second encoding operation to the first image for training to obtain a feature map corresponding to the first image for training, generating an integrated feature map using the feature map corresponding to the first depth map for training and the feature map corresponding to the first image for training, and applying decoding operation to the integrated feature map to output the first variance estimation information.

In an example, the outputting of the first variance estimation information may include outputting first width variance estimation information and first height variance estimation information for respective pixels of the first depth map for training to match respective pixels of the first image for training, the respective pixels corresponding to the respective pixels of the first depth map for training, as the first variance estimation information.

In an example, the learning method may further include, after updating the parameter of the variance estimation network, obtaining second variance estimation information for a second depth map for training to match a second image for training, outputting suitability determination information corresponding to whether the second depth map for training is suitable as training data for training of a depth map estimation network, based on the second variance estimation information, and back-propagating a suitability loss based on the suitability determination information and suitability GT information corresponding to the suitability determination information to update a parameter of a suitability determination network for outputting the suitability determination information.

In an example, the parameter of the variance estimation network may be freezing.

In an example, the outputting of the suitability determination information may include applying suitability determination operation to the second depth map for training to generate first to nth pieces of area suitability determination information respectively corresponding to first to nth areas of the second depth map for training and outputting the suitability determination information based on the first to nth pieces of area suitability determination information.

In an example, the learning method may further include applying noise addition operation to at least some of the at least one piece of first point cloud data for training to generate the first depth map for training, before obtaining the first depth map for training and the first image for training.

In an example, the generating of the first depth map for training may include additionally applying filtering operation for removing specific first point cloud data for training, the specific first point cloud data corresponding to a specific position of the first surrounding environment information, among the at least one piece of first point cloud data for training to generate the first depth map for training.

According to another example of the present disclosure, a test method may include obtaining a depth map for testing based on point cloud data for testing for surrounding environment information for testing and an image for testing, the image corresponding to the depth map for testing, outputting variance estimation information for testing for the depth map for testing to match the image for testing, based on the depth map for testing and the image for testing, and outputting suitability determination information for testing, the suitability determination information indicating whether the depth map for testing is suitable for training of a depth map estimation network, based on the variance estimation information for testing.

The present technology may provide the learning device for constructing the training data used to train the depth map estimation network, the learning method thereof, the test device using the same, and the test method using the same.

The present technology may provide the learning device for outputting variance estimation information about a variance necessary for a depth map to match an image, the learning method thereof, the test device using the same, and the test method using the same.

The present technology may provide the learning device for outputting suitability determination information corresponding to whether a depth map is suitable as training data for training of a depth map estimation network, the learning method thereof, the test device using the same, and the test method using the same.

The present technology may provide the learning device for reducing time and cost consumed to construct training data for training of the depth map estimation network, the learning method thereof, the test device using the same, and the test method using the same.

The present technology may provide the learning device for effectively selecting data to construct training data for training of the depth map estimation network, the learning method thereof, the test device using the same, and the test method using the same.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

What is claimed is:

1. A device comprising:
a processor; and
memory storing instructions that, when executed by the processor, cause the device to:
  obtain:
    at least one first depth map based on at least one piece of cloud data associated with surrounding environment information; and
    at least one first image associated with the at least one first depth map;
  determine, based on the at least one first depth map and the at least one first image, first variance estimation information indicating a variance between the at least one first depth map and the at least one first image;
  back-propagate a variance loss based on:
    the first variance estimation information; and
    first variance ground truth (GT) information associated with the first variance estimation information; and update, based on the back-propagated variance loss, a parameter associated with determining the first variance estimation information.

2. The device of claim 1, wherein the instructions, when executed by the processor, cause the device to:

apply a first encoding operation to the at least one first depth map;

obtain, based on the first encoding operation, a first feature map corresponding to the at least one first depth map;

apply a second encoding operation to the at least one first image;

obtain, based on the second encoding operation, a second feature map corresponding to the at least one first image;

generate an integrated feature map based on:

the first feature map; and the second feature map;

apply a decoding operation to the integrated feature map; and determine, based on the decoding operation, the first variance estimation information.

3. The device of claim 1, wherein the first variance estimation information comprises:

width variance estimation information indicating a width variance; and height variance estimation information indicating a height variance, wherein the width variance and the height variance are variances between respective pixels of the at least one first depth map and respective pixels of the at least one first image, the respective pixels of the at least one first image corresponding to the respective pixels of the at least one first depth map.

4. The device of claim 1, wherein the instructions, when executed by the processor, cause the device to determine, based on second variance estimation information, suitability determination information indicating whether a second depth map is acceptable as training data for training of a depth map estimation network, wherein the second variance estimation information indicates a variance between the second depth map and a second image.

5. The device of claim 4, wherein the instructions, when executed by the processor, cause the device to:

obtain the second variance estimation information;

back-propagate a suitability loss based on:

the suitability determination information; and suitability GT information associated with the suitability determination information; and update, based on the back-propagation of the suitability loss, a parameter associated with determining the suitability determination information.

6. The device of claim 4, wherein the instructions, when executed by the processor, cause the device to update a parameter associated with determining the suitability determination information based on a state in which the parameter, associated with determining the first variance estimation information, is fixed.

7. The device of claim 4, wherein the instructions, when executed by the processor, cause the device to:

apply a suitability determination operation to the second depth map;

generate, based on the suitability determination operation, first to n-th pieces of area suitability determination information respectively corresponding to first to n-th areas of the second depth map; and determine the suitability determination information based on the first to n-th pieces of area suitability determination information.

8. The device of claim 1, wherein the instructions, when executed by the processor, cause the device to:

apply a noise addition operation to the at least one piece of cloud data; and generate, based on the noise addition operation, the at least one first depth map.

9. The device of claim 8, wherein the instructions, when executed by the processor, cause the device to:

perform a filtering operation to remove data from the at least one piece of cloud data, the removed data corresponding to a position of the surrounding environment information; and generate, based on the filtering operation, the at least one first depth map.

10. A device comprising:

a processor; and memory storing instructions that, when executed by the processor, cause the device to:

obtain:

a depth map for testing based on point cloud data associated with surrounding environment information for testing; and an image for testing associated with the depth map for testing;

determine variance estimation information for testing indicating a variance between the depth map for testing and the image for testing; and determine, based on the variance estimation information for testing, suitability determination information for testing indicating whether the depth map for testing is acceptable for training of a depth map estimation network.

11. A method comprising:

obtaining:

at least one first depth map based on at least one piece of cloud data associated with surrounding environment information; and at least one first image associated with the at least one first depth map;

determining, based on the at least one first depth map and the at least one first image, first variance estimation information indicating a variance between the at least one first depth map and the at least one first image; and back-propagating a variance loss based on:

the first variance estimation information; and variance ground truth (GT) information associated with the first variance estimation information; and updating, based on the back-propagating the variance loss, a parameter associated with determining the first variance estimation information.

12. The method of claim 11, wherein the determining the first variance estimation information comprises:

applying a first encoding operation to the at least one first depth map;

obtaining, based on the first encoding operation, a first feature map corresponding to the at least one first depth map;

applying a second encoding operation to the at least one first image;

obtaining, based on the second encoding operation, a second feature map corresponding to the at least one first image;

generating an integrated feature map based on:

the first feature map; and the second feature map;

applying a decoding operation to the integrated feature map; and determining, based on the decoding operation, the first variance estimation information.

13. The method of claim 11, wherein the first variance estimation information comprises:

width variance estimation information indicating a width variance; and height variance estimation information indicating a height variance, wherein the width variance and the height variance are variances between respective pixels of the at least one first depth map and respective pixels of the at least one first image, the respective pixels of the at least one first image corresponding to the respective pixels of the at least one first depth map.

14. The method of claim 11, further comprising, after updating the parameter associated with determining the first variance estimation information:

obtaining second variance estimation information indicating a variance between a second depth map and a second image;

determining, based on the second variance estimation information, suitability determination information indicating whether the second depth map is acceptable as training data for training of a depth map estimation network;

back-propagating a suitability loss based on:

the suitability determination information; and suitability GT information associated with the suitability determination information; and updating, based on the back-propagating the suitability loss, a parameter associated with a determination of the suitability determination information.

15. The method of claim 11, further comprising determining, based on second variance estimation information, suitability determination information indicating whether a second depth map is acceptable as training data for training of a depth map estimation network, wherein the second variance estimation information indicates a variance between the second depth map and a second image.

16. The method of claim 14, wherein the determining the suitability determination information comprises:

applying a suitability determination operation to the second depth map;

generating, based on the suitability determination operation, first to n-th pieces of area suitability determination information respectively corresponding to first to n-th areas of the second depth map; and determining the suitability determination information based on the first to n-th pieces of area suitability determination information.

17. The method of claim 11, further comprising, before obtaining the at least one first depth map and the at least one first image:

performing a noise addition operation on the at least one piece of cloud data; and generating, based on the noise addition operation, the at least one first depth map.

18. The method of claim 17, wherein the generating the at least one first depth map comprises:

performing a filtering operation to remove data from the least one piece of cloud data, the removed data corresponding to a position of the surrounding environment information; and generating, based on the filtering operation, the at least one first depth map.

19. A method comprising:

obtaining:

a depth map for testing based on point cloud data associated with surrounding environment information for testing; and an image for testing associated with the depth map for testing;

determining, based on the depth map for testing and the image for testing, variance estimation information for testing indicating a variance between the depth map for testing and the image for testing; and determining, based on the variance estimation information for testing, suitability determination information for testing indicating whether the depth map for testing is acceptable for training of a depth map estimation network.

20. The device of claim 10, wherein the instructions, when executed by the processor, cause the device to determine the variance estimation information for testing by a variance estimation network having a parameter updated based on back-propagating a variance loss, wherein the variance loss is based on first variance estimation information and first variance ground truth (GT) information associated with the first variance estimation information, and wherein the instructions, when executed by the processor, cause the device to determine the suitability determination information for testing by a suitability determination network having a parameter updated, after the updating of the parameter associated with determining the first variance estimation information, based on:

obtaining second variance estimation information indicating a variance between a second depth map and a second image;

determining, based on the second variance estimation information, suitability determination information indicating whether the second depth map is acceptable as training data for training of a depth map estimation network;

back-propagating a suitability loss based on:

the suitability determination information; and suitability GT information associated with the suitability determination information; and updating, based on the back-propagating the suitability loss, a parameter associated with a determination of the suitability determination information.

* * * * *